(12) United States Patent
Fischer

(10) Patent No.: US 6,572,112 B1
(45) Date of Patent: Jun. 3, 2003

(54) CONDUCTING RACE FOR STREET CARS

(76) Inventor: Kern L. Fischer, 5 N 775 Campton Ridge, St. Charles, IL (US) 60175

( * ) Notice: Subject to any disclaimer, the term of this patent is extended or adjusted under 35 U.S.C. 154(b) by 0 days.

(21) Appl. No.: 10/143,368

(22) Filed: May 13, 2002

(51) Int. Cl.$^7$ .................................................. A63F 9/14
(52) U.S. Cl. ...................................................... 273/445
(58) Field of Search ................................. 273/445, 440; 463/6

(56) References Cited

U.S. PATENT DOCUMENTS

| | | | | |
|---|---|---|---|---|
| 5,398,941 A | * | 3/1995 | Paulson ....................... | 273/445 |
| 6,254,478 B1 | * | 7/2001 | Namanny et al. .............. | 463/6 |
| 6,293,548 B1 | * | 9/2001 | Swyers et al. ............... | 273/236 |
| 6,325,721 B1 | * | 12/2001 | Miyamoto et al. ............ | 463/40 |

* cited by examiner

Primary Examiner—Raleigh W. Chiu
(74) Attorney, Agent, or Firm—John L. Schmitt

(57) ABSTRACT

A race for street cars driven by non professional drivers on circuit-type race courses begins with an average car driver wishing to race other like drivers requesting an application for registration. The entrants, with now pre safety inspected cars, arrive at the track on the day and time set out in the application. Entrants are assigned to groups based on the performance potential of their cars, generally whether the car is a large or small sports or touring type car. After being briefed on race procedures and rules, the entrants undertake a practice driving session on the track course. Next, the entrants drive 10–15 qualifying laps with the time of each lap recorded. Based on the fastest qualifying lap time, a Performance Parity Time (PPT) is calculated for each entrant. Now ready to race and again by group, the entrants are released from the track pit in reverse order based on their respective differences in PPT. Each race, typically 50 laps, may require at least one pit stop. A portion of the PPT can be used to hold faster PPT entrants in the pit for predetermined stop periods. The entrant with the lowest PPT would merely stop-and-go in the pit. To promote safety, passing is restricted to straightaway sections of the course. An entrant can be penalized for unsafe driving or driving at a pace that exceeds the entrant's Break-Out Time (BOT), based on the entrant's lowest lap qualifying time. The winner is the first entrant to complete the set number of laps in the race with the remaining entrants then continuing to race to determine their respective order as they complete the required number of laps.

16 Claims, 1 Drawing Sheet

CONDUCTING RACE FOR STREET CARS

BACKGROUND OF THE INVENTION

1. Field of Invention

This invention relates to conducting competitive racing events and more particularly to conducting races for street cars that includes a handicap system that equalizes driver skill and car performance, rules that promote safety, and penalties for exceeding handicap determined speeds or unsafe driving and unsportsmanlike conduct.

2. Prior Art

Man has an inherent need to complete. As civilization has advanced the forms of competition have become more sophisticated to include more than individual verses individual or individual and animal combinations. Newly invented machines are quickly added to the mix. Today, vehicle competition is a billion dollar plus business with the competition formats varying from tractor-pulls to NASCAR stock car racing and CART custom-built cars racing at speeds that exceed 200 mph.

One race format or method of conducting racing events is disclosed in U.S. Pat. No. 5,398,941. In this format, the contest comprises individual sprint races having respective sets of lanes. Individual competitors are assigned predetermined speed rankings. Based on these speed rankings, competitors then are assigned to particular sprints and particular lanes in that sprint. For example, if there are four competitors and two lanes, the fastest competitor is assigned to sprint 1, lane 1, the second fastest to lane 1, sprint 2, the third fastest to sprint 1, lane 2, and the slowest to sprint 2, lane 2. The winner of a sprint, for example the first sprint where the fastest competitor races the third fastest competitor, is the first to finish. The overall winner of the competition is the competitor with the fastest time.

A further method of conducting a race is set out in U.S. Pat. No. 6,293,548. In this format qualifying trials are used to determine race starting positions and gain an award of qualifying credits Q which may be points or a credit of time in seconds. The award of Q credits is limited to top qualifiers. Based on the qualifying times, the racers then are arranged in reverse order, and the race begins. For the race, the top qualifiers are additionally assigned passing credits P to promote the faster racers passing the slower ones. The first racer to cross the finish line is the traditional winner. To determine the overall winner, individual finishing times are adjusted for earned credits.

U.S. Pat. No. 6,325,721 sets out a still further method of conducting a race using computer generated images of venues and contestants. Based on imputed past and current data, the contestants race on a display. Viewers can increase or decrease the value of certain factors comprising the imputed data, such as wind velocity and direction. If correctly judged, these weighing changes can influence the outcome of the race.

SUMMARY OF THE INVENTION

A race format, particularly adapted nonprofessional driven street cars racing on local tracks, includes pre-race safety checks to insure that each car is in sound mechanical condition. Once the entrants have assembled at the track on the day of the race, the entrants are grouped based on the respective performance potential of their cars. In general terms, the cars are classified as sports or touring. Then, these classifications are further divided into large and small based on engine displacement. After the entrants have been briefed on driving and course rules and procedures, the drivers make practice runs to familiarize themselves with the race course.

Next, each entrant drives 10 to 15 qualifying laps with the time of each lap recorded. Based on the difference between the lowest recorded lap time by the slowest car in a group and the lowest lap time of the faster remaining cars in the group, Performance Parity Times (PPT's) are calculated for all the cars. Performance Parity Times are individual handicaps that provide respective equalization between the slowest and the progressively faster cars.

The entrants of a group then are assembled in the pit of the track in their respective ascending PPT order so that the slowest car (PPT=0) is first in line and the fastest car is last in line. The cars then are released to race based on their respective PPT's. For example, if the next slowest car has a PPT equal to 20 seconds, this second slowest car is released 20 seconds after the slowest car starts. During the race, all passing is limited to designated straightaway sections of the course. Additionally, at least one pit stop typically is required during the race. A portion of the PPT's can be used to implement respective pit stop holding times. Lastly, entrants are penalized for unsafe driving and unsportsmanlike conduct or having a lap time less than their respective Break-Out Times (BOT). BOT is the fastest respective qualifying lap time minus 2.0 seconds, for example. The BOT penalty inhibits faster cars qualifying at a reduced speed to gain a PPT starting or pit stop advantage. Racing continues until the first entrant completes the required number of laps comprising the race. The remaining entrants then continue to race to establish their finishing order.

The racing format of this invention provides a number of advantages over racing formats now known or in use.

A first advantage of this inventive racing format is that an average driver with a street car is allowed to enjoy the excitement of automotive racing without incurring an unreasonable risk to damage or injury. There are numerous safety requirements. Each car must pass a pre-race mechanical safety check. Practice laps allow individual drivers to become familiar with physical constraints of the race course and the effects from unusual environmental conditions. Zones to pass other entrants during the race are limited to straightaway sections of the race course. Assessment of penalties for unsafe driving or unsportsmanlike conduct inhibits recklessness. The Break-Out Penalty places a check on excessive speeds. Because safety is built into the race format, no special car or driver safety equipment is required other than a helmet.

The enjoyment and thrill experienced by an entrant also may be enjoyed by a passenger. Passenger participation will depend on driver experience and passenger experience. This option is available to sponsors of a particular event.

Further, the format may be adapted to team racing where a team comprises two or more drivers, typically more than one car, or any number of car-driver combinations. Team racing also can be limited to teams driving one particular car model, for example Corvettes.

A still further advantage is that any driver can be a winner regardless of the car potential performance. Use of Performance Parity Times allows all cars to compete regardless of performance potential. The Break-Out Time penalty then insures that the PPT handicaps work by preventing sandbagging by drivers in faster cars. A premium is placed on driver skill.

Another advantage is that the basic race format may be offered as a Sprint, 15 laps or approximately 30 minutes driving time depending on the length of the race course. Alternately, the race may be offered in an Enduro format lasting a minimum of four hours. This Enduro format typically is divided into one-half hour segments and is particularly well suited for team racing discussed above.

DESCRIPTION OF THE PREFERRED EMBODIMENT

Figure 1:
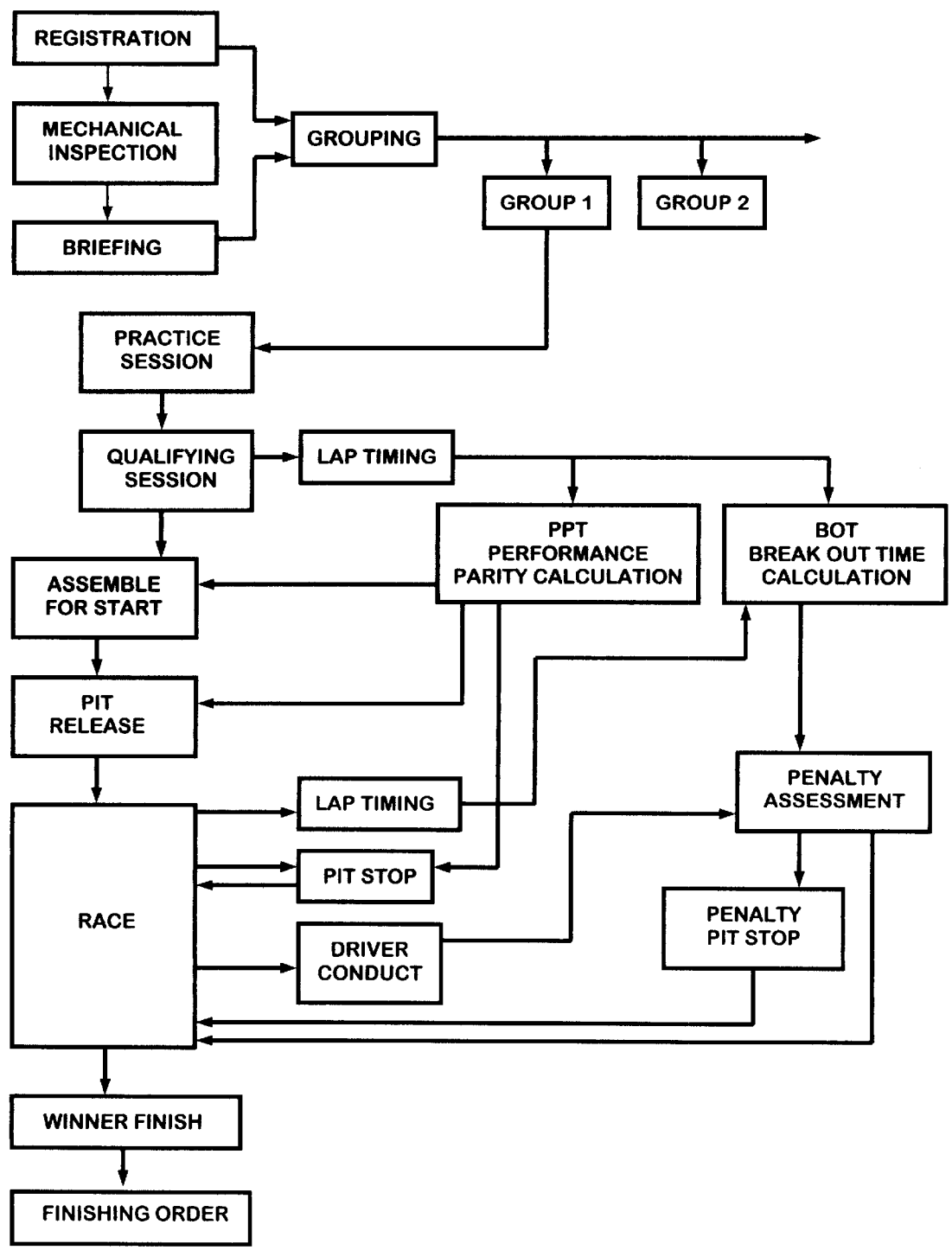
FIG. 1 is a flowchart setting out the steps undertaken to complete a race of this invention.

The race of this invention begins with registration. Applications for registration may be obtained before the day of the race though the mail, by telephone, over the internet, or on the day of the race at the track. Pre-registration allows entrants to learn when and where to arrive at the race track, have a car mechanical safety check performed before the day of the race, and review the rules and procedures controlling race conduct. Where a sufficient number of cars have registered before the day of the race, sponsors of the race can begin organizing the entrants into groups based on performance potential. Note that the event is open to all street cars, but not open to other vehicles classified as trucks, e.g., pickups, minivans, SUV'S, etc.

Based on approximate performance potential, the entrants are divided into two primary classes, Sports & GT Cars and Touring Cars. The first primary classification then is subdivided into two subclasses, large Sports & GT Cars comprising for example, Corvettes, Ferrari's, Mustangs, and Vipers, and small Sports & GT's comprising for example Toyota MR2's, Miata's, Audi TT's and Honda Civic Coupe's. The Touring Car classification is likewise divided into large Touring Cars comprising BMW 3 and 5 Series, Taurus's, Impala SS's and Cadillac CTS' and small Touring Cars that would include Toyota Civic 4-Dr's, Ford Escort's, and Dodge Neon's, for example. Since the race procedure for each group is substantially the same, FIG. 1 only shows the activities for one group.

The next step after registration is for entrants to attend a briefing session. At this briefing each entrant learns to which group that entrant has been assigned, assuming more than one group, the time that each race activity begins, is provided an opportunity to ask questions, and is briefed on race rules and procedures, in particular the assessment of penalties. Penalties are assessed for unsafe driving, exceeding the car's Break-Out Time (BOT) during the race, and for unsportsmanlike conduct.

Examples of unsafe driving are as follows:
1. Failure to remain in-file in non passing zones.
2. Failure to maintain car in-file spacing in no-passing zones.
3. Failure to fully pass a just passed car before returning to an in-file position.
4. Failure to allow an entrant leaving the pit to merge into the race course.
5. Bumping another entrant, whether intentional or unintentional.

Examples of unsportsmanlike conduct are as follows:
1. Interfering with the passing of a faster entrant by moving into a blocking position or increasing driving speed unreasonably.
2. Blocking or impeding passing at or near an end of a passing zone.
3. Engaging in verbal or physical altercations with other entrants, event officials, or track management.

Penalties for unsafe or unsportsmanlike driving include:
1. Requiring a pit stop.
2. Removal from the race.
3. Exclusion from all remaining event activities.
4. Exclusion from future events.

Following this briefing, entrants take practice laps about the track course. Practice laps allow each entrant to gain a feeling of the course configuration, in particular learn the location of the passing zones and acuteness of the course curves. Additionally, entrants may gain experience from driving with other drivers in his or her group and learn the need to adjust car performance to weather or other course conditions. Typically, the practice session will not exceed 10 to 15 laps about the race course.

Following this practice session is a qualifying session where each entrant must drive a set number of qualifying laps about the race course, again 10 to 15 laps. The time of each qualifying lap is recorded. When all entrants of a group have completed this qualifying session, a Performance Parity Time (PPT) for each entrant is calculated. The PPT is the difference between the fastest qualifying lap time of the respective cars and the fastest qualifying lap time of the slowest car times the number of laps in the race. The formula for PPT is as follows:

$$PPT = LTD \times N$$

where:
PPT—Performance Parity Time
LTD—Lap time difference to slowest car.
N—Number of laps in the race.

Applying this formula to the following example, if the fastest qualifying lap time of the slowest entrant is 120 seconds and the next slowest entrant has a fastest qualifying lap time of 115 seconds, the PPT for the second slowest entrant is 75.0 seconds for a 15-lap race ( $PPT=[120-115] \times 15$ ). The PPT may be applied at the time of starting or divided into parts with a first part applied when starting and the remainder part applied at the time the entrant makes a mandatory pit stop. After qualifying, event officials may move certain entrants to other groups to minimize PPT differentials. Table I below shows how the PPT is calculated for a 12-entrant group racing 15 laps over a two-mile course with the PPT's then divided into two equal start and pit time delay periods.

TABLE I

| STARTING POSITION | CAR NO. | QUALIFYING TIME | DIFFERENCE TO SLOWEST CAR (In Seconds) | PPT | START TIME DELAY | PIT TIME DELAY |
|---|---|---|---|---|---|---|
| 1 | 4 | 2:16.83 | 0.00 | 0.00 | 0.00 | 0.00 |
| 2 | 10 | 2:16.51 | 0.32 | 4.80 | 2.50 | 2.50 |
| 3 | 7 | 2:16.17 | 0.66 | 9.90 | 5.00 | 5.00 |
| 4 | 9 | 2:15.42 | 1.41 | 21.15 | 10.50 | 10.50 |
| 5 | 5 | 2:14.86 | 1.97 | 29.55 | 15.00 | 15.00 |
| 6 | 12 | 2:14.23 | 2.60 | 39.00 | 19.50 | 19.50 |
| 7 | 1 | 2:12.69 | 4.14 | 62.10 | 31.00 | 31.00 |
| 8 | 11 | 2:12.04 | 4.79 | 71.85 | 36.00 | 36.00 |
| 9 | 8 | 2:09.36 | 7.47 | 112.05 | 56.00 | 56.00 |
| 10 | 2 | 2:08.54 | 8.29 | 124.35 | 62.00 | 62.00 |
| 11 | 6 | 2:05.47 | 11.36 | 170.40 | 85.00 | 85.00 |
| 12 | 3 | 2:03.62 | 13.21 | 198.15 | 99.00 | 99.00 |

As noted in Table I, the sequence for entrants starting the race is in ascending order of the PPT's for the entrants in that group. For the race, the entrants are assembled in this order in-file in the track pit and then selectively released. Where the PPT is divided into two time delay periods, the last entrant is released 99.00 seconds after the first entrant is released, based on the Table I group. Note that there is about a 6 mph. qualifying speed difference between the fastest and slowest entrant.

During the race the entrants drive the course in-file except in passing zones where faster running entrants attempt to pass slower running entrants. In-file means that the entrants may be in one or more lanes but must maintain front end and rear end spacing. The lap time of each entrant for each lap is recorded. Any entrant having a lap time less that its Break-Out Time (BOT) is penalized. The formula for calculating the Break-Out Time for each entrant is as follows:

$$BOT = QT - BOT\ Factor$$

Where:

BOT—Break-Out Time

QT—Lowest Qualifying Lap Time

BOT Factor—00:02.00 seconds, for example.

Using the data set out in Table I, Car 4 has a Break-Out Time of 2:14.83 seconds (BOT=2:16.83—0:02.00); the Break-Out Time for Car 6 is 2:03.47 seconds (BOT=2:05.47—0:02.00). On a two-mile course, where the QT is 2.00 minutes, this 2-second factor is equal to about one mph driving speed.

If, during the race, an entrant has a lap time that is less than its BOT, that entrant is penalized by being flagged into the pit for a stop-and-go. The purpose of BOT is to induce entrants to drive at a pace that is equal to or only slightly faster than their best qualifying speed. Concurrently, the BOT penalty inhibits entrants driving at a slower pace during qualifying to be assigned a smaller PPT and then drive at a significantly faster pace during the race. To permit any significant qualifying-race pace differential would negate the effect of PPT's to handicap the entrants and keep the race competitive.

As noted earlier, the race may include a mandatory pit stop during the race: Except when the pit is temporarily closed, for example during starting, an entrant may make this pit stop at any time. The time that an entrant must remain in the pit is determined by that entrant's PPT. Again referring to Table I, Car 4 would make a stop-and-go pit stop having a PPT equal to zero. Car 11 must remain in the pit for 36 seconds assuming its PPT is divided into two delay periods. The exact point in the race when to make this pit stop should be part of an entrant's race management strategy. For instance, where an entrant becomes trapped behind several slower moving cars with little chance to pass quickly, that entrant may decide to pit. Upon reentering the course, that entrant would acquire a different relative position with respect to the remaining cars; hopefully this new position would provide a better opportunity for passing.

The race continues with the winner taking the checkered flag as the first car to cross the finish line after completing the required number of laps, for example 15 laps. The remaining entrants then continue to race to establish their respective order of finishing. Entrants that do not finish, because of mechanical problems, for example, are ranked after the last finishing entrant based on the number of laps completed.

As discussed briefly above, the basic race format may be offered as a Sprint format (15–25 laps depending on course length) or an Enduro format (4 hours minimum) where a team of drivers competes against other teams of a like number of drivers. Each driver of the team would drive a car for about one-half hour in a relay fashion or a four-driver team could alternate driving two cars. Again, each car and driver must establish a respective PPT to insure that the teams are competitively handicapped.

While embodiments, uses, and advantages of this invention have been shown and discussed, it should be understood that this invention is limited only by the scope of the claims. Those skilled in the art will appreciate that various modifications and changes may be made without departing from the scope and spirit of the invention, and these modifications and changes may result in further uses and advantages.

What I claim is:

1. A method of conducting a race for amateur driven street vehicles comprising the steps of:

assigning entrants to said race comprising X number of laps about a race course to groups based on respective performance potential of said vehicles with said groups including a first group, requiring said entrants in said first group to traverse qualifying laps about said race course, timing said qualifying laps of said entrants in said first group, calculating a Performance Parity Time (PPT) for each said entrant in said first group based on differences in qualifying lap times of said respective entrants in said first group multiplied by said a number proximately equal to X, calculating a Break-Out Time (BOT) for each said entrant in said first group based on each said entrant's qualifying lap times less a constant measured in units of time, releasing said entrants in said first group to said race course at time intervals based on said respective PPT's of said entrants, allowing said released entrants in said first group to race, limiting passing during said race by faster running entrants of slower running entrants in said first group to designated passing zones on said race course, timing each lap of said entrants in said first group during said race, penalizing said entrants for driving at a pace during said race that exceeds said entrants' respective BOT pace and identifying a race winner of said first group as said entrant first to complete N laps.

2. Conducting a race particularly adapted for street cars driven by lay drivers about a course of a race track, a format of said race comprising the steps of assigning entrants to said race to groups based on respective performance potential of cars of said entrants with said groups including a first group, requiring each said entrant in said first group to traverse a number of qualifying laps about said course, timing individual laps of each said entrant in said first group to determine the lowest lap qualifying time of each said entrant, calculating a Performance Parity Time (PPT) for each said entrant in said first group based on said lowest lap qualifying time of each said entrant using the formula:

$$PPT = LTD \times N$$

where:
PPT—Performance Parity Time,
LTD—Qualifying Lap Time Difference to Slowest Entrant in said First Group Qualifying Lap Time,
N—Number of Laps in Race,
calculating a Break-Out Time (BOT) for each said entrant in said first group based on said lowest lap qualifying lap time of said respective entrants using the formula:

$$BOT = QT - BOT\ Factor$$

where:
BOT—Break-Out Time,
QT—Qualifying lap time,
BOT Factor—(X seconds),
assembling said entrants in said first group based on an ascending order of said respective PPT of each said entrant,
releasing said entrants in said first group to said race course based on said respective PPT's
allowing said released entrants in said first group to race,
limiting passing during said race by faster running cars of slower running cars to designated passing zones on said race course,
timing each lap of each said entrant in said first group during said race,
penalizing a respective entrant for driving at a pace during said race where said entrant's lap time is less than said entrant's BOT, and
identifying a group winner of said race as said entrant first to complete N laps.

3. A race format as defined by claim 2 and further characterized by said format including,
a practice session for said entrants.

4. A race format as defined by claim 2 and further characterized by said format including,
said entrant having a passenger in said entrant's car during selective portions of said race.

5. A race format as defined by claim 2 and further characterized by said format including,
said first group comprising teams of entrants.

6. A race format as defined by claim 2 and further characterized by said format including,
said grouping based on performance potential of cars of said entrants.

7. A race format as defined by claim 2 and further characterized by,
said race portion of said format including a pit stop.

8. A race as defined by claim 7 and further characterized by,
said pit stop being mandatory and including holding periods based in part on said respective PPT's.

9. A race format as defined by claim 2 and further characterized by,
said passing zone being limited to straightway sections of said race course.

10. A race as defined by claim 2 and further characterized by,
said respective entrants being assessed penalties for unsafe driving during said race.

11. A race as defined by claim 2 and further characterized by,
said respective entrants being assessed penalties for unsportsmanlike conduct.

12. A race as defined by claim 2 and further characterized by,
finishing positions of a remainder of said entrants after said winner being based on the respective order of said remaining entrants completing X number of laps.

13. A race as defined by claim 2 and further characterized by,
said entrants limited to driving in-file in non passing zones of said course during said race.

14. A race as defined by claim 2 and further characterized by,
said assembling of said entrants for starting said race being in a pit area of said track.

15. A race as defined by claim 2 and further characterized by,
said race being run in a Sprint format or an Enduro format.

16. A race as defined by claim 2 and further characterized by,
said entrants attending a briefing session and passing a safety check before said entrants drive on said course.

* * * * *